US010216288B2

(12) United States Patent
Takase et al.

(10) Patent No.: US 10,216,288 B2
(45) Date of Patent: Feb. 26, 2019

(54) CURSOR POSITION CONTROLLING APPARATUS, CURSOR POSITION CONTROLLING METHOD, PROGRAM AND INFORMATION STORAGE MEDIUM

(71) Applicant: Sony Computer Entertainment Inc., Tokyo (JP)

(72) Inventors: Masaki Takase, Tokyo (JP); Junichi Naoi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/908,622

(22) PCT Filed: Aug. 20, 2014

(86) PCT No.: PCT/JP2014/071742
§ 371 (c)(1),
(2) Date: Jan. 29, 2016

(87) PCT Pub. No.: WO2015/025874
PCT Pub. Date: Feb. 26, 2015

(65) Prior Publication Data
US 2016/0170501 A1  Jun. 16, 2016

(30) Foreign Application Priority Data

Aug. 20, 2013 (JP) ................. 2013-170805

(51) Int. Cl.
*G06F 3/033* (2013.01)
*G06F 3/0346* (2013.01)
(Continued)

(52) U.S. Cl.
CPC .......... *G06F 3/0346* (2013.01); *G06F 3/0236* (2013.01); *G06F 3/038* (2013.01);
(Continued)

(58) Field of Classification Search
CPC .... G06F 3/0334; G06F 3/0338; G06F 3/0346; G06F 3/04892
(Continued)

(56) References Cited

U.S. PATENT DOCUMENTS 5,596,347 A * 1/1997 Robertson ........... G06F 3/04812
345/157
7,071,917 B2 * 7/2006 Kori ....................... G06F 1/1616
345/1.1
(Continued)

FOREIGN PATENT DOCUMENTS

CN    201025530 Y   2/2008
CN    101578569 A   11/2009
(Continued)

OTHER PUBLICATIONS

European Search Report for corresponding EP application No. 14837792, 10 pages, dated Dec. 2, 2016.
(Continued)

Primary Examiner — Roy P Rabindranath
(74) Attorney, Agent, or Firm — Matthew B. Dernier, Esq.

(57) ABSTRACT

The operability is improved when an operation for moving a cursor to a target position is carried out by a controller which outputs operation amount data associated with an operation amount vector representative of a direction and a magnitude of the operation. An operation amount component specification unit specifies, on the basis of the operation amount data, the magnitude of a first operation amount component and the magnitude of a second operation amount component. A movement amount component determination unit determines the magnitude of a first movement amount component and the magnitude of a second movement amount component. A cursor position changing unit changes the position of the cursor from a current position of the
(Continued)

cursor to a position spaced by the magnitude of the first movement amount component in a first disposition direction and spaced by the magnitude of the second movement amount component in a second disposition direction. The disposition distance between the choices along the second disposition direction is shorter than the disposition distance between the choices along the first disposition direction. The ratio of the magnitude of the second movement amount component to the magnitude of the second operation amount component is smaller than the ratio of the magnitude of the first movement amount component to the magnitude of the first operation amount component.

9 Claims, 12 Drawing Sheets

(51) Int. Cl.
*G06F 3/0482* (2013.01)
*G06F 3/023* (2006.01)
*G06F 3/0338* (2013.01)
*G06F 3/0354* (2013.01)
*G06F 3/038* (2013.01)

(52) U.S. Cl.
CPC ........ *G06F 3/0338* (2013.01); *G06F 3/03543* (2013.01); *G06F 3/0482* (2013.01)

(58) Field of Classification Search
USPC .......................................... 345/157
See application file for complete search history.

(56) References Cited

U.S. PATENT DOCUMENTS

| | | |
|---|---|---|
| 8,010,313 B2 | 8/2011 | Mathews |
| 8,442,798 B2 | 5/2013 | Mathews |
| 2007/0245259 A1 | 10/2007 | Carlson |
| 2009/0309830 A1 | 12/2009 | Yamamoto |
| 2009/0326857 A1* | 12/2009 | Mathews ................ G06F 3/038 702/141 |
| 2012/0194426 A1 | 8/2012 | Mathews |
| 2012/0206363 A1* | 8/2012 | Kyprianou .......... G06F 3/04886 345/168 |
| 2013/0145320 A1 | 6/2013 | Oosterholt |
| 2014/0071048 A1* | 3/2014 | Kim ....................... G06F 3/033 345/157 |

FOREIGN PATENT DOCUMENTS

| | | |
|---|---|---|
| CN | 102165395 A | 8/2011 |
| CN | 103038737 A | 4/2013 |
| EP | 2157498 A1 | 2/2010 |
| JP | 10260784 A | 9/1998 |
| WO | 2008156141 A1 | 12/2008 |

OTHER PUBLICATIONS

International Search Report for corresponding PCT Application No. PCT/JP2014/071742, 1 page, dated Sep. 30, 2014.
Office Action for corresponding CN application No. 201480044637.9, 20 pages, dated Mar. 13, 2018.

* cited by examiner

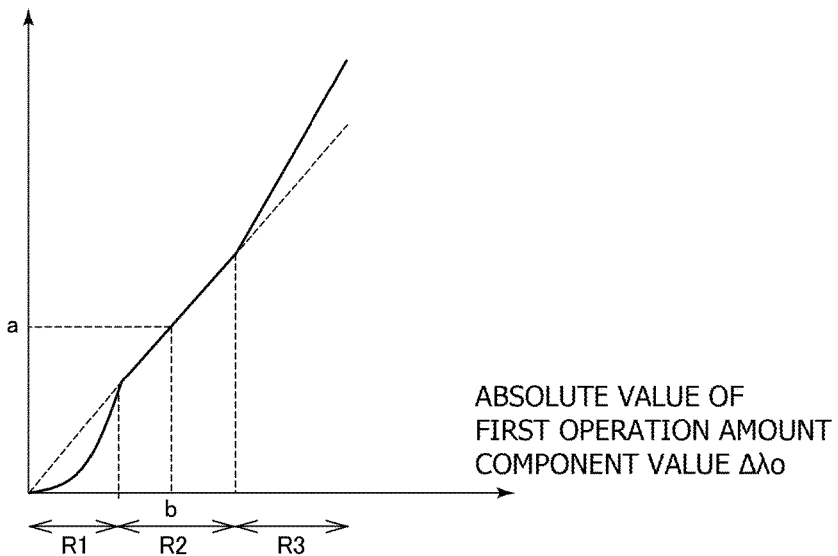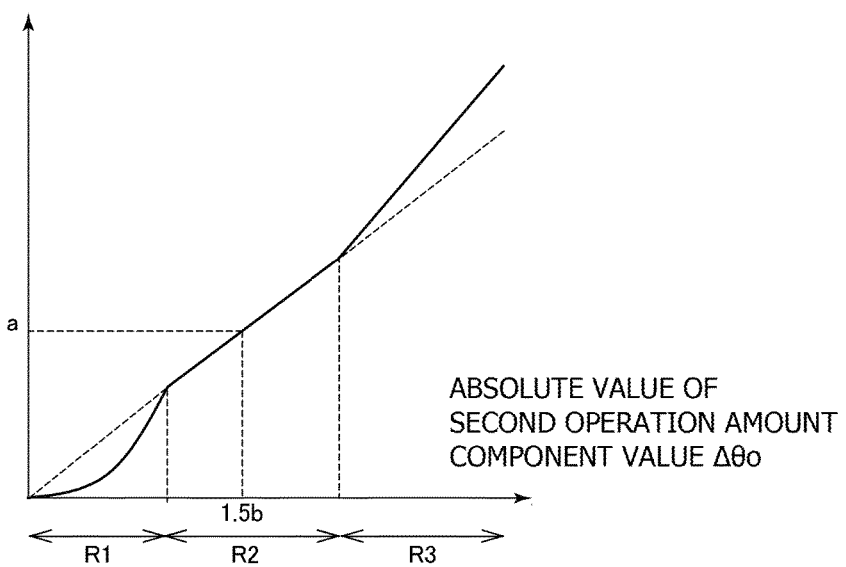
FIG. 11

FIG.12
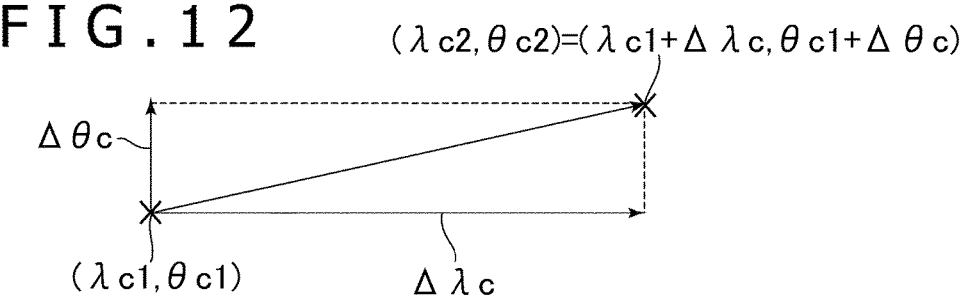
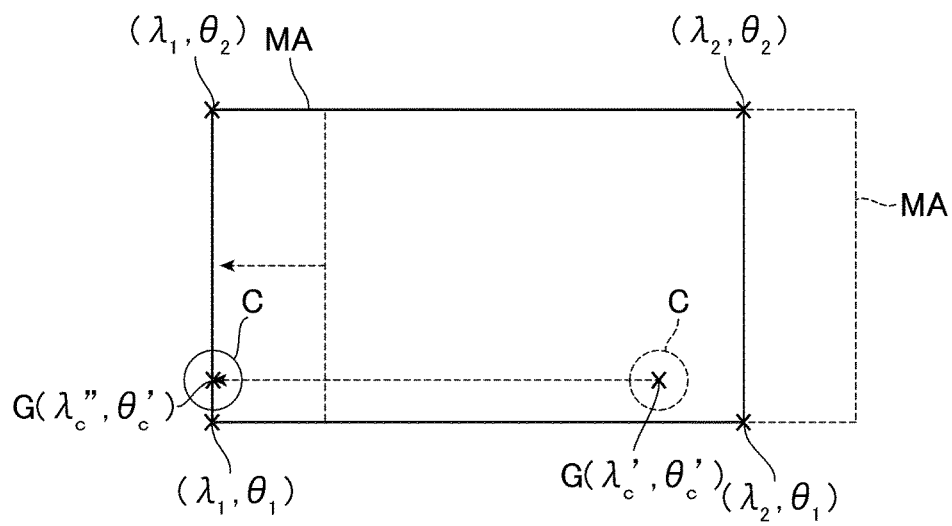
FIG.13

CURSOR POSITION CONTROLLING APPARATUS, CURSOR POSITION CONTROLLING METHOD, PROGRAM AND INFORMATION STORAGE MEDIUM

TECHNICAL FIELD

The present invention relates to a cursor position controlling apparatus, a cursor position controlling method, a program and an information storage medium.

BACKGROUND ART

A technology is available wherein, if a user operates a controller to move a cursor and then performs a predetermined determination operation, then a process corresponding to a choice disposed at the position of the cursor is executed. As an example of such a technology as just described, a technology of an on-screen keyboard is available wherein a character corresponding to an image of a key disposed at the position of the cursor upon the determination operation is treated as an inputted character (refer to, for example, PTL 1).

Also a technology is available wherein the position of an object such as an image representative of an aim is controlled by a controller which outputs operation amount data associated with an operation amount vector representative of a direction and a magnitude of an operation as an operation signal. As such a controller as just described, a controller or the like is available which outputs an operation signal associated, for example, with an amount of rotation detected by a gyro sensor or a tilt amount of an analog controller. In the technology, a direction and a magnitude represented by an operation amount vector and a direction and a magnitude in and by which an object moves are associated with each other. In a controller which outputs an operation signal associated with an amount of rotation detected by a gyro sensor, if the controller is rotated, for example, in the clockwise direction, then the object moves rightwardly, but if the controller is rotated in the counterclockwise direction, then the object moves leftwardly. Further, for example, as the amount of rotation of the controller increases, the amount of the movement of the object increases.

CITATION LIST

Patent Literature

[PTL 1] U.S. Patent Application Publication No. 2007/0245259

SUMMARY

Technical Problem

The disposition distance between choices such as images of keys on an on-screen keyboard sometimes differs, for example, between a vertical direction and a horizontal direction. However, in the conventional technology described above wherein the position of an object is controlled by a controller which outputs operation amount data associated with an operation amount vector, such a situation as described above is not taken into consideration. In other words, the sensitivity of the controller, here, the ratio of the magnitude of the amount of movement of the cursor to the magnitude of the operation amount, is equal irrespective of the direction. Therefore, if the conventional technology is applied to an operation for moving the cursor to an image of a target key, then it is more difficult to carry out an operation for moving the cursor to an image of a target key in a direction in which the disposition distance between choices is shorter than that in a direction in which the disposition distance between choices is greater.

The present invention has been made in view of the problem described above, and one of objects of the present invention resides in provision of a cursor position controlling apparatus, a cursor position controlling method, a program and an information storage medium by which the operability when an operation for moving a cursor to a target position is carried out by a controller which outputs operation amount data associated with an operation amount vector representative of a direction and a magnitude of the operation is improved.

Solution to Problem

In order to solve the problem described above, according to the present invention, there is provided a cursor position controlling apparatus for controlling a position of a cursor in an image in which a plurality of choice groups each including a plurality of choices disposed along a first disposition direction are represented and are disposed along a second disposition direction different from the first disposition direction, including an operation amount data acquisition unit configured to acquire operation amount data associated with an operation amount vector representative of a direction and a magnitude of an operation, an operation amount component specification unit configured to specify, on the basis of the operation amount data, a magnitude of a first operation amount component which is a component of the operation amount vector in a first operation direction and a magnitude of a second operation amount component which is a component of the operation amount vector in a second operation direction different from the first operation direction, a movement amount component determination unit configured to determine, on the basis of the magnitude of the first operation amount component, a magnitude of a first movement amount component which is a component of a movement amount vector representative of a movement amount of the cursor in the first disposition direction and determine, on the basis of the magnitude of the second operation amount component, a magnitude of a second movement amount component which is a component of the movement amount vector in the second disposition direction, and a cursor position changing unit configured to change a position of the cursor from a current position of the cursor to a position spaced by the magnitude of the first movement amount component in the first disposition direction and spaced by the magnitude of the second movement amount component in the second disposition direction, a disposition distance between the choice groups along the second disposition direction being shorter than a disposition distance between the choices along the first disposition direction, a ratio of the magnitude of the second movement amount component to the magnitude of the second operation amount component being smaller than a ratio of the magnitude of the first movement amount component to the magnitude of the first operation amount component.

Further, according to the present invention, there is provided a cursor position controlling method for controlling a position of a cursor in an image in which a plurality of choice groups each including a plurality of choices disposed along a first disposition direction are represented and are disposed along a second disposition direction different from the first disposition direction, the method including an operation amount data acquisition step of acquiring operation amount data associated with an operation amount vector representative of a direction and a magnitude of an operation, an operation amount component specification step of specifying, on the basis of the operation amount data, a magnitude of a first operation amount component which is a component of the operation amount vector in a first operation direction and a magnitude of a second operation amount component which is a component of the operation amount vector in a second operation direction different from the first operation direction, a movement amount component determination step of determining, on the basis of the magnitude of the first operation amount component, a magnitude of a first movement amount component which is a component of a movement amount vector representative of a movement amount of the cursor in the first disposition direction and determining, on the basis of the magnitude of the second operation amount component, a magnitude of a second movement amount component which is a component of the movement amount vector in the second disposition direction, and a cursor position changing step of changing a position of the cursor from a current position of the cursor to a position spaced by the magnitude of the first movement amount component in the first disposition direction and spaced by the magnitude of the second movement amount component in the second disposition direction, a disposition distance between the choice groups along the second disposition direction being shorter than a disposition distance between the choices along the first disposition direction, a ratio of the magnitude of the second movement amount component to the magnitude of the second operation amount component being smaller than a ratio of the magnitude of the first movement amount component to the magnitude of the first operation amount component.

Further, according to the present invention, there is provided a program executed by a computer which controls a position of a cursor in an image in which a plurality of choice groups each including a plurality of choices disposed along a first disposition direction are represented and are disposed along a second disposition direction different from the first disposition direction, the program causing the computer to execute a procedure for acquiring operation amount data associated with an operation amount vector representative of a direction and a magnitude of an operation, a procedure for specifying, on the basis of the operation amount data, a magnitude of a first operation amount component which is a component of the operation amount vector in a first operation direction and a magnitude of a second operation amount component which is a component of the operation amount vector in a second operation direction different from the first operation direction, a procedure for determining, on the basis of the magnitude of the first operation amount component, a magnitude of a first movement amount component which is a component of a movement amount vector representative of a movement amount of the cursor in the first disposition direction and determining, on the basis of the magnitude of the second operation amount component, a magnitude of a second movement amount component which is a component of the movement amount vector in the second disposition direction, and a procedure for changing a position of the cursor from a current position of the cursor to a position spaced by the magnitude of the first movement amount component in the first disposition direction and spaced by the magnitude of the second movement amount component in the second disposition direction, a disposition distance between the choice groups along the second disposition direction being shorter than a disposition distance between the choices along the first disposition direction, a ratio of the magnitude of the second movement amount component to the magnitude of the second operation amount component being smaller than a ratio of the magnitude of the first movement amount component to the magnitude of the first operation amount component.

Furthermore, according to the present invention, there is provided a computer-readable information storage medium storing a program executed by a computer which controls a position of a cursor in an image in which a plurality of choice groups each including a plurality of choices disposed along a first disposition direction are represented and are disposed along a second disposition direction different from the first disposition direction, the program causing the computer to execute a procedure for acquiring operation amount data associated with an operation amount vector representative of a direction and a magnitude of an operation, a procedure for specifying, on the basis of the operation amount data, a magnitude of a first operation amount component which is a component of the operation amount vector in a first operation direction and a magnitude of a second operation amount component which is a component of the operation amount vector in a second operation direction different from the first operation direction, a procedure for determining, on the basis of the magnitude of the first operation amount component, a magnitude of a first movement amount component which is a component of a movement amount vector representative of a movement amount of the cursor in the first disposition direction and determining, on the basis of the magnitude of the second operation amount component, a magnitude of a second movement amount component which is a component of the movement amount vector in the second disposition direction, and a procedure for changing a position of the cursor from a current position of the cursor to a position spaced by the magnitude of the first movement amount component in the first disposition direction and spaced by the magnitude of the second movement amount component in the second disposition direction, a disposition distance between the choice groups along the second disposition direction being shorter than a disposition distance between the choices along the first disposition direction, a ratio of the magnitude of the second movement amount component to the magnitude of the second operation amount component being smaller than a ratio of the magnitude of the first movement amount component to the magnitude of the first operation amount component.

In the present invention, the ratio of the magnitude of the movement amount of the cursor to the magnitude of the operation amount in the direction in which the disposition distance between the choices is shorter is smaller than that in the direction in which the disposition distance is longer. Thus, with the present invention, the operability is improved when an operation for moving the cursor to a target position is carried out by using a controller which outputs operation amount data associated with an operation amount vector representative of a direction and a magnitude of an operation thereof.

In an embodiment of the present invention, the first disposition direction is a horizontal direction on a display unit on which the image is displayed, and the second disposition direction is a vertical direction on the display unit.

Further, in another embodiment of the present invention, the position of the cursor in the image is limited to a region which occupies part of the image.

In this embodiment, the choices are disposed at ends of the region.

In a further embodiment of the present invention, the operation amount data acquisition unit acquires the operation amount data associated with a rotation amount vector detected by a gyro sensor, the operation amount component specification unit specifies, on the basis of the operation amount data, a magnitude of a first rotation amount component which is a component of the operation amount vector in a first rotation direction and a magnitude of a second rotation amount component which is a component of the operation amount vector in a second rotation direction different from the first rotation direction, and the movement amount component determination unit determines the magnitude of the first movement amount component on the basis of the magnitude of the first rotation amount component and determines the magnitude of the second movement amount component on the basis of the magnitude of the second rotation amount component.

In a still further embodiment of the present invention, the number of choices disposed along the second disposition direction is smaller than the number of choices disposed along the first disposition direction.

BRIEF DESCRIPTION OF DRAWINGS

FIG. 11 is a view depicting an example of a relationship between an absolute value of an operation amount component value and an absolute value of a movement amount component value.

FIG. 12 is a view depicting an example of a relationship between a cursor coordinate value and a movement amount component value.

FIG. 13 is a view depicting an example of a manner in which a movable region moves.

DESCRIPTION OF EMBODIMENT

In the following, an embodiment of the present invention is described in detail with reference to the drawings.

Figure 1:
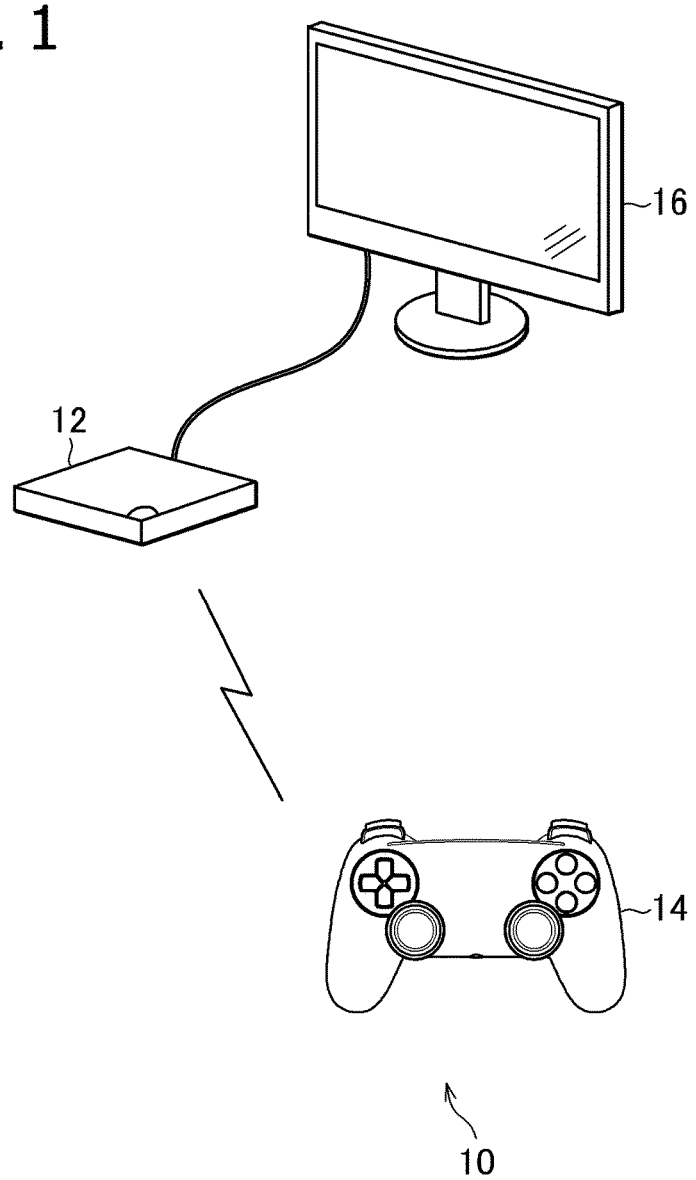
FIG. 1 is a view depicting an example of a general configuration of an information processing system according to an embodiment of the present invention.

FIG. 1 is a view depicting an example of a general configuration of an information processing system 10 according to the embodiment of the present invention. As depicted in FIG. 1, the information processing system 10 according to the present embodiment includes an information processing apparatus 12, a controller 14 and a display unit 16.

Figure 2:
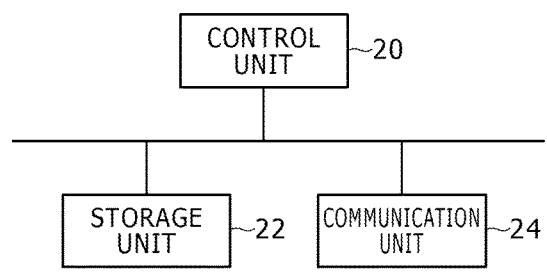
FIG. 2 is a view depicting an example of a hardware configuration of the information processing apparatus according to the embodiment of the present invention.

The information processing apparatus 12 according to the present embodiment is a computer such as, for example, a game apparatus or a personal computer and includes, for example, as depicted in FIG. 2, a control unit 20, a storage unit 22, and a communication unit 24. The control unit 20 is a program-controlled device such as, for example, a CPU which operates in accordance with a program installed in the information processing apparatus 12. The storage unit 22 is a storage element such as, for example, a ROM or a RAM, a hard disk drive or the like. A program to be executed by the control unit 20 is stored in the storage unit 22. The communication unit 24 is a communication interface such as, for example, a network board or a wireless LAN module.

Figure 3:
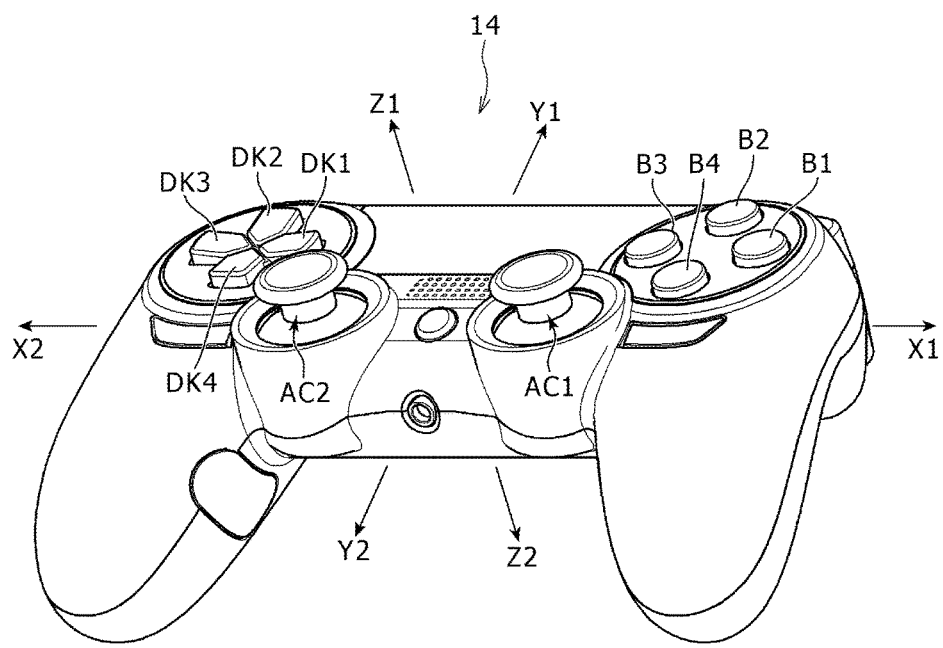
FIG. 3 is a view depicting an example of an appearance of a controller according to the embodiment of the present invention.

The controller 14 according to the present embodiment is an operation inputting apparatus for carrying out operation inputting to the information processing apparatus 12. FIG. 3 is a view depicting an example of an appearance of the controller 14 according to the present embodiment. In the present embodiment, on an upper face of the controller 14, four direction keys DK1 to DK4, four buttons B1 to B4 and two analog controllers AC1 and AC2 are disposed. The controller 14 includes also other operation members. Further, the controller 14 according to the present embodiment includes sensors such as a gyro sensor which detects an angular velocity and an acceleration sensor which detects an acceleration. It is to be noted that the controller 14 according to the present embodiment may include an electronic compass (geomagnetism sensor) which detects an orientation. Further, the controller 14 according to the present embodiment includes a network board, a wireless LAN module and so forth and can communicate with the information processing apparatus 12 by wire communication or wireless communication. In the description given below, it is assumed that a Y1 direction and a Y2 direction depicted in FIG. 3 are a forward direction and a rearward direction, respectively. Further, it is assumed that an X1 direction and an X2 direction are a rightward direction and a leftward direction, respectively. Furthermore, it is assumed that a Z1 direction and a Z2 direction are an upward direction and a downward direction, respectively.

The display unit 16 according to the present embodiment is a liquid crystal display unit, an organic EL display unit or the like. In the present embodiment, the information processing apparatus 12 and the display unit 16 are connected to each other by a cable such as an HDMI (registered trademark) (High-Definition Multimedia Interface) cable or a USB (Universal Serial Bus) cable.

Figure 4:
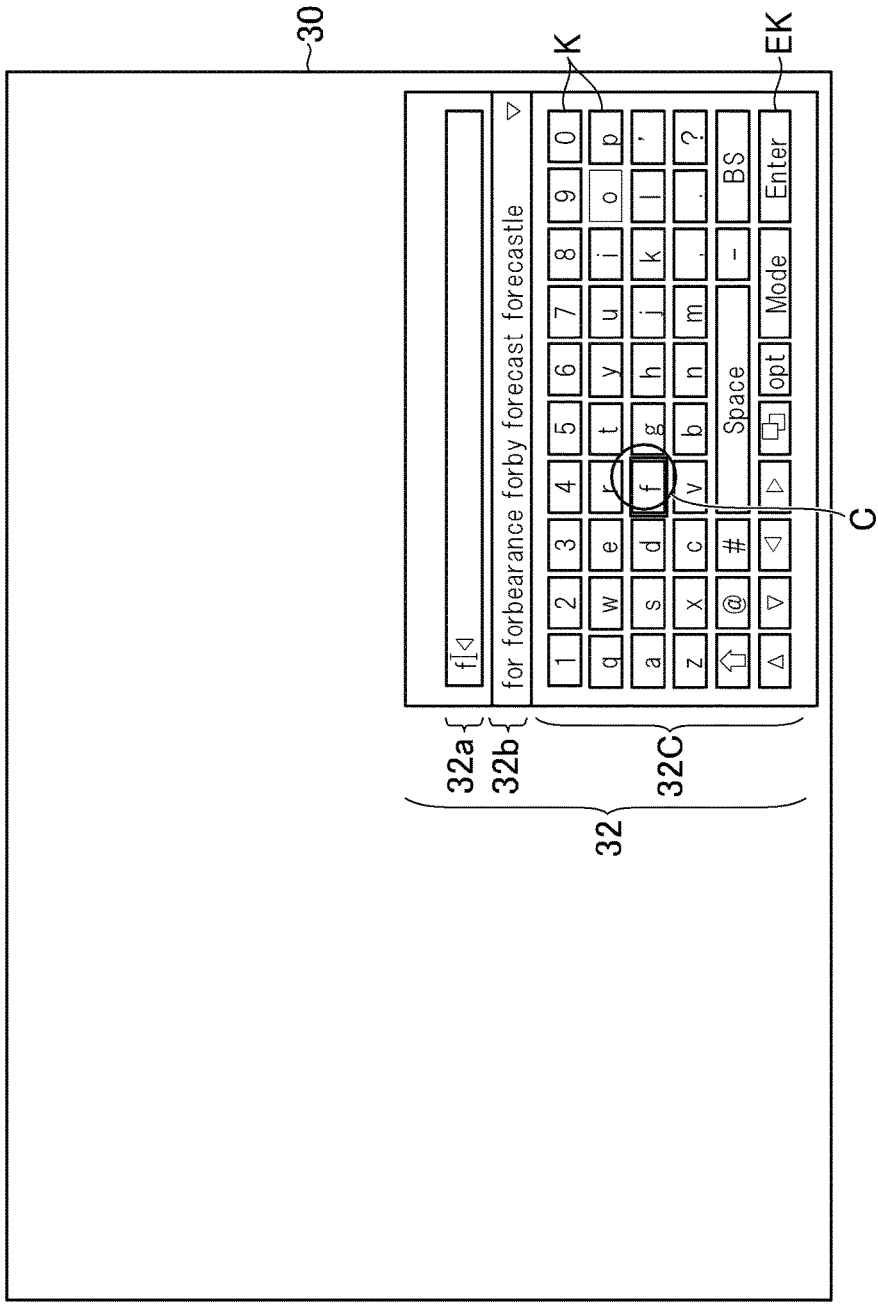
FIG. 4 is a view depicting an example of an entire image.

FIG. 4 is a view depicting an example of an image displayed on the display unit 16 in the present embodiment. In the following description, the image is referred to as entire image 30. In the present embodiment, a region which occupies part of the entire image 30 is set as an on-screen keyboard region 32 in which an image of an on-screen keyboard is disposed.

The on-screen keyboard region 32 includes a character string disposition region 32a, a prediction candidate disposition region 32b and a key disposition region 32c. In the character string disposition region 32a in the present embodiment, a character string is disposed. Further, in the prediction candidate disposition region 32b in the present embodiment, a list of one or a plurality of prediction candidates specified on the basis of a character string disposed in the character string disposition region 32a is disposed in a horizontally juxtaposed state. Further, in the key disposition region 32c, a plurality of choices, for example, in the present embodiment, an image of a plurality of keys K is disposed.

In the present embodiment, the keys K are disposed in a matrix in the key disposition region 32c. In particular, in the key disposition region 32c, a plurality of key groups each including a plurality of keys K disposed along a horizontal direction are disposed over a plurality of rows in a vertical direction. In particular, for example, 10 keys K are disposed in a horizontal direction in four rows beginning with the top row. Further, in a row below the four rows, six keys K are disposed in a horizontal direction, and in the lowermost row, eight keys K are disposed in a horizontal direction.

Further, as depicted in FIG. 4, in the present embodiment, the disposition distance between the keys K along the vertical direction is shorter than the disposition distance between the keys K along the horizontal direction. Further, the number of keys K disposed along the vertical direction is smaller than the number of keys K disposed along the horizontal direction.

Also a cursor C is disposed on the entire image 30. The cursor C in the present embodiment is a circular figure. In the present embodiment, the user can move the cursor C by operating the controller 14. In the present embodiment, the position of the cursor C changes in response to a variation of the posture of the controller 14, namely, in response to an amount of rotation of the controller 14, detected by the gyro sensor provided in the controller 14. In the present embodiment, for example, if the user carries out a rotational operation in the counterclockwise direction as viewed along the X2 direction around an axis provided by the X1-X2 direction for the controller 14, then the cursor C moves in the upward direction, but if the user performs a rotational operation in the clockwise direction, then the cursor C moves in the downward direction. Further, if the user performs a rotational operation in the counterclockwise direction as viewed along the Z2 direction around an axis given by the Z1-Z2 direction for the controller 14, then the cursor C moves in the leftward direction, but if the user carries out a rotational operation in the clockwise direction, then the cursor C moves in the rightward direction.

In the present embodiment, one of the plurality of keys K is determined as a key K in a selected state on the basis of the position of the cursor C, then the key K in the selected state is highlighted. In FIG. 4, a rectangle surrounding a key K which is a target of highlighting represents that the pertaining key K is highlighted. In the on-screen keyboard depicted in FIG. 4, the key K corresponding to the character "f" is in a selected state.

Figure 5:
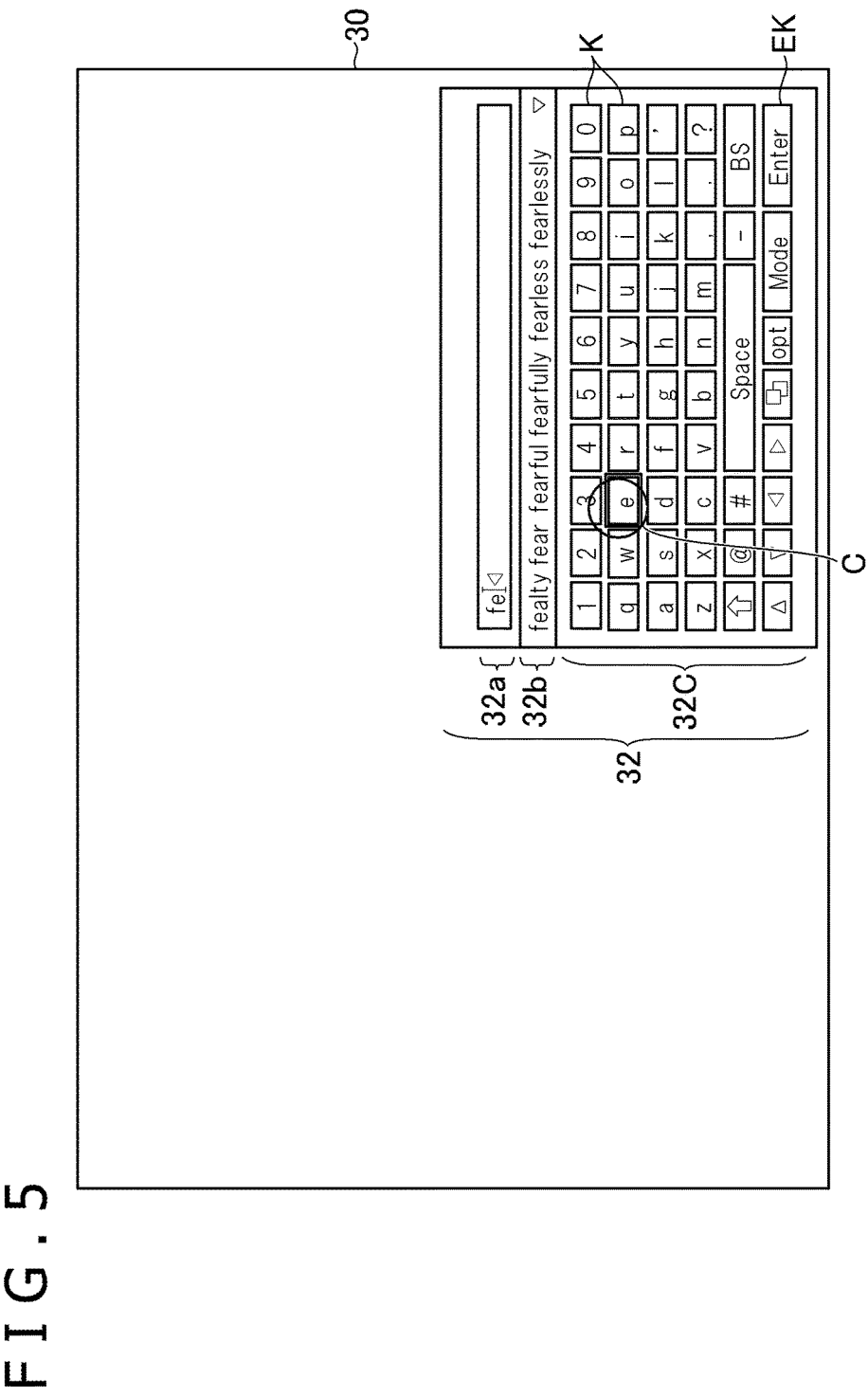
FIG. 5 is a view depicting another example of an entire image.

If the user carries out a determination operation, for example, in the present embodiment, an operation of depressing the button B1, then the operation is treated as such that the key K in the selected state is inputted, and a character corresponding to the pertaining key K is added to a character string disposed in the character string disposition region 32a. FIG. 5 depicts the entire image 30 when the cursor C is moved leftwardly upwardly from a state in which the entire image 30 depicted in FIG. 4 is displayed and then a determination operation is carried out. On the on-screen keyboard depicted in FIG. 5, the key K corresponding to the character "e" is in a selected state, and the character "e" is added to the character string disposed in the character string disposition region 32a.

Then, if the user places an enter key EK disposed at a right lower position of the key disposition region 32c into a selected state and then carries out a determination operation, then the character string disposed in the character string disposition region 32a is treated as an input character string to the information processing apparatus 12. Then, a process corresponding to the character string is executed.

Figure 6:
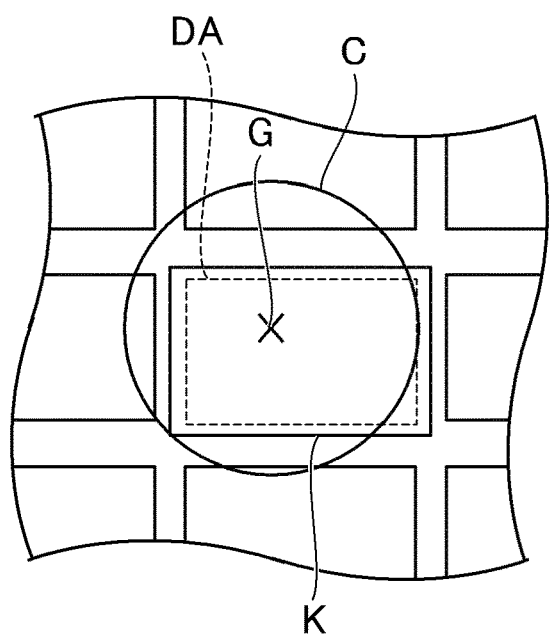
FIG. 6 is a view depicting an example of a relationship between a key and a determination area.

In the present embodiment, if a key K in a selected state exists as depicted in FIG. 6, then when the position of the center G of gravity of the cursor C moves into a decision region DA which occupies part of the key K, the key K in the selected state is updated to the pertaining key K. In the present embodiment, the decision region DA which occupies part of a key K has the center of gravity whose position coincides with that of the pertaining key K. Further, in the present embodiment, the height and the width of the decision region DA are equal to a predetermined multiple of the height and the width of the key K, for example, ⅞. In this manner, in the present embodiment, it is prevented that, where the cursor C is disposed in the proximity of a boundary of the key K, the key K in the selected state is updated in an excessively high frequency.

Further, in the present embodiment, an operation for moving the cursor C into the character string disposition region 32a or the prediction candidate disposition region 32b can be carried out. Also, an operation for designating a range of characters disposed in the character string disposition region 32a, another operation for canceling the designated range and a further operation for selecting a prediction candidate disposed in the prediction candidate disposition region 32b can be performed. Here, when the position of the center G of gravity of the cursor C is placed into the character string disposition region 32a, the circular cursor C may be erased from the entire image 30 and another cursor of a vertical bar shape (caret) indicative of an addition position of a character disposed in the character string disposition region 32a may be blinked. Further, at this time, in place of or in addition to blinking of the caret, the color of the caret may be changed. This makes it possible to let the user recognize that an operation in the character string disposition region 32a can be carried out. Further, when the position of the center G of gravity of the cursor C goes out from the character string disposition region 32a or goes out from a predetermined region surrounding the character string disposition region 32a, the circular cursor C may be disposed into the entire image 30 again.

Figure 7:
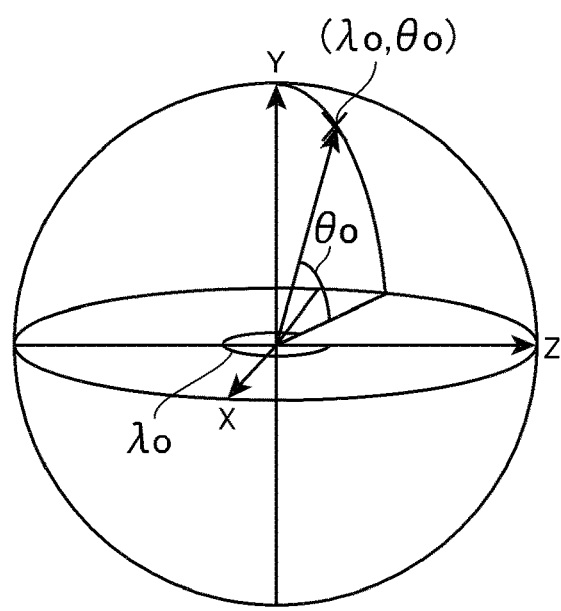
FIG. 7 is a view depicting an example of a detection result space.

In the following, a moving operation of the cursor C in the present embodiment is described further. FIG. 7 depicts an example of a detection result space 34 which is a virtual three-dimensional space representing a relationship between the posture of the controller 14 and parameters representative of the posture. In the detection result space 34 depicted in FIG. 7, it is assumed that the direction to this side is an X-axis positive direction; the upward direction is a Y-axis positive direction; and the rightward direction is a Z-axis positive direction. The Z-axis positive direction is referred to as reference direction.

In the present embodiment, the posture with respect to the reference direction is specified on the basis of rotation information of the quaternion format which is a result of detection by the gyro sensor. In the present embodiment, in an initial state or when a resetting operation is carried out, the Y1 direction of the controller 14 is set so as to coincide with the reference direction in the detection result space 34 depicted in FIG. 7. It is to be noted that, in the present embodiment, a depression operation of the analog controller AC1 is treated as a resetting operation. Then, the posture of the controller 14 with respect to the reference direction is specified on the basis of the rotation information described above with reference to the posture of the controller 14 in the initial state or when a resetting operation is carried out. In the present embodiment, the posture with respect to the reference direction is represented by coordinate values ($\lambda$o, $\theta$o) in a spherical coordinate system set in the detection result space 34 depicted in FIG. 7. The coordinate values are hereinafter referred to as operation coordinate values. In the present embodiment, the value $\lambda$o represents an angle which is positive in the direction of rotation from the Z-axis positive direction to the X-axis positive direction. The value $\theta$o represents an angle which is positive in the direction of rotation from a direction along the XZ plane toward the Y-axis positive direction. Further, in the present embodiment, rotation of the controller 14 in the clockwise direction as viewed along the Z2 direction around the Z1-Z2 direction is treated as rotation which increases the value $\lambda$o, and the rotation in the counterclockwise direction is treated as rotation which decreases the value $\lambda$o. Further, in the present embodiment, rotation of the controller 14 in the counterclockwise direction as viewed along the X2 direction around the X1-X2 direction is treated as rotation which increases the value $\theta$o, and rotation in the clockwise direction is treated as rotation which decreases the value $\theta$o.

In the present embodiment, detection of the posture by the gyro sensor is carried out at a predetermined frame rate. In the present embodiment, detection of the posture is carried out after every interval of, for example, 1/60 second. Further, specification of the operation coordinate values ($\lambda$o, $\theta$o) is carried out at the predetermined frame rate. Further, in the present embodiment, an amount of movement of the cursor C, namely, a variation amount of the position of the cursor C, is determined on the basis of the operation amount in the detected one frame, for example, in the present embodiment, the amount of rotation of the controller 14 in one frame. In the following description, the difference of the $\lambda$o component of the operation coordinate values ($\lambda$o, $\theta$o) in one frame is referred to as first operation amount component, and the difference of the $\theta$o component of the operation coordinate values ($\lambda$o, $\theta$o) in one frame is referred to as second operation amount component. Further, the value of the first operation amount component is represented as first operation amount component value $\Delta\lambda$o, and the value of the second operation amount component is represented as second operation amount component value $\Delta\theta$o.

For example, it is assumed that it is specified that the operation coordinate values ($\lambda$o, $\theta$o) in a certain frame are ($\lambda$o1, $\theta$o1). Then, it is assumed that it is specified that the operation coordinate values ($\lambda$o, $\theta$o) in a next frame are ($\lambda$o2, $\theta$o2). In this case, the first operation amount component value $\Delta\lambda$o is given by $\lambda$o2−$\lambda$o1, and the second operation amount component value $\Delta\theta$o is given by $\theta$o2−$\theta$o1.

Figure 9:
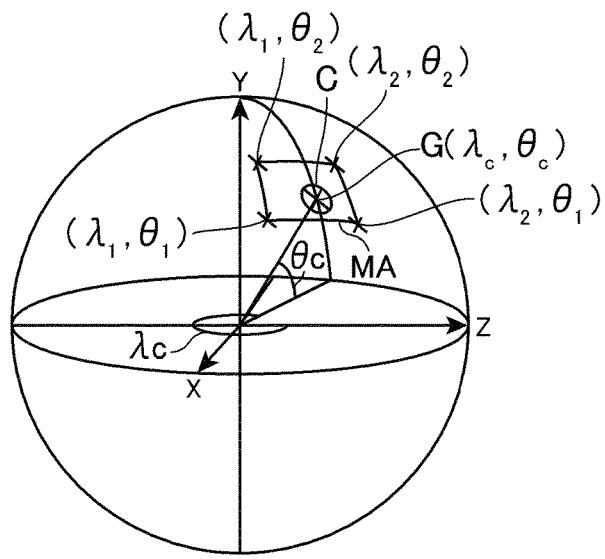
FIG. 9 is a view depicting an example of a cursor space.

Further, in the present embodiment, the amount of movement of the cursor C in one frame in the spherical coordinate system set in a cursor space 36 depicted in FIG. 9 is determined on the basis of the first operation amount component value $\Delta\lambda$o and the second operation amount component value $\Delta\theta$o.

FIG. 9 depicts an example of the cursor space 36 which is a virtual three-dimensional space in which a relationship between the position of the cursor C and a movable region MA (refer to FIG. 10) which occupies part of the on-screen keyboard. On a spherical plane in the cursor space 36 depicted in FIG. 9, the cursor C and the movable region MA are disposed. In the cursor space 36 depicted in FIG. 9, the direction toward this side is the X-axis positive direction; the upward direction is the Y-axis positive direction; and the rightward direction is the Z-axis positive direction. The Z-axis positive direction is referred to as reference direction.

In the present embodiment, if an amount of movement of the cursor C is determined, then the position of the cursor C and the movable region MA in the spherical coordinate system of the cursor space 36 depicted in FIG. 9 is determined on the basis of the amount of movement. Here, it is assumed that the position of the center of gravity of the cursor C in the spherical coordinate system set in the cursor space 36 depicted in FIG. 9 is represented by coordinate values ($\lambda$c, $\theta$c). In FIG. 9, the coordinate values are depicted by G($\lambda$c, $\theta$c). The coordinate values are hereinafter referred to as cursor coordinate values. Further, the positions of the four corners of the movable region MA are represented as ($\lambda$1, $\theta$1), ($\lambda$1, $\theta$2), ($\lambda$2, $\theta$1) and ($\lambda$2, $\theta$2). It is to be noted that the value $\lambda$1 is smaller than the value $\lambda$2 and the value $\theta$1 is smaller than the value $\theta$2. In the present embodiment, the values $\lambda$c, $\lambda$1 and $\lambda$2 represent rotational angles where the direction of rotation from the Z-axis positive direction toward the X-axis positive direction is in the positive, and the values $\theta$c, $\theta$1 and $\theta$2 represent rotational angles where the direction of rotation from a direction along the XZ plane toward the Y-axis positive direction is in the positive.

Figure 10:
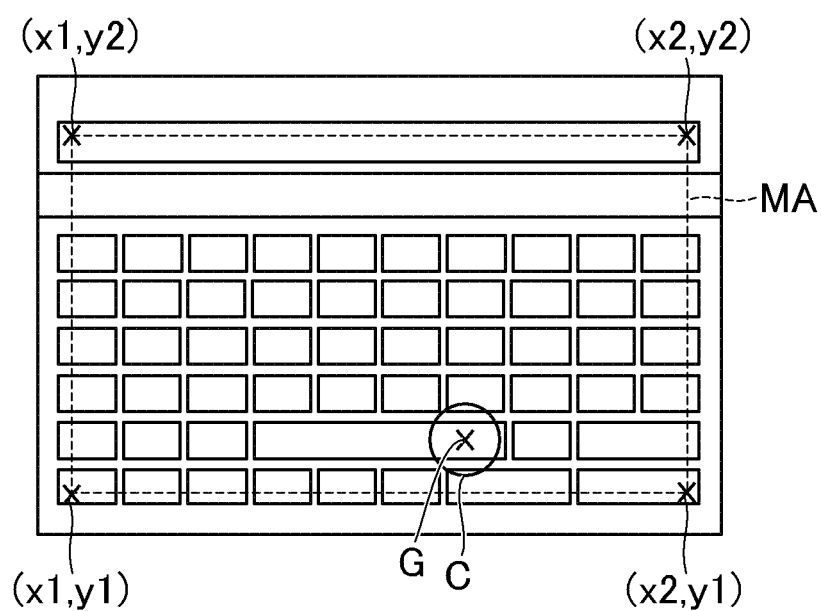
FIG. 10 is a view depicting an example of a relationship between a position and a movable region of a cursor.

FIG. 10 depicts an example of the positional relationship between the on-screen keyboard and the movable region MA. In FIG. 10, characters disposed on the keys K are omitted. A region obtained by coordinate-transformation of the movable region MA depicted in FIG. 9 from a partial spherical plane into a flat plane is indicated as the movable region MA in FIG. 10. In particular, the positions associated with the coordinate values ($\lambda$1, $\theta$1), ($\lambda$1, $\theta$2), ($\lambda$2, $\theta$1) and ($\lambda$2, $\theta$2) in FIG. 9 are the positions of the coordinate values (x1, y1), (x1, y2), (x2, y1) and (x2, y2) in FIG. 10. Further, in the present embodiment, a relative position of the cursor C in the movable region MA when the movable region MA depicted in FIG. 9 is coordinate-transformed from a partial spherical plane into a flat plane is maintained also in the movable region MA depicted in FIG. 10. In the present embodiment, the range within which the cursor C can move is restricted to the movable region MA.

In the following description, the difference between the $\lambda$c components of the cursor coordinate values ($\lambda$c, $\theta$c) in one frame is represented as first movement amount component, and the difference between the $\theta$c components of the cursor coordinate values ($\lambda$c, $\theta$c) in one frame is represented as second movement amount component. Further, the value of the first movement amount component is represented as first movement amount component value $\Delta\lambda$c, and the value of the second movement amount component is represented as second movement amount component value $\Delta\theta$c. In the present embodiment, the first movement amount component value $\Delta\lambda$c is determined on the basis of the first operation amount component value $\Delta\lambda$o and the second movement amount component value $\Delta\theta$c is determined on the basis of the second operation amount component value $\Delta\lambda$o in accordance with the relationship depicted in FIG. 11. FIG. 11 depicts an example of the relationship between the absolute value of the first operation amount component value $\Delta\lambda o$ and the absolute value of the first movement amount component value $\Delta\lambda c$ and a relationship between the absolute value of the second operation amount component value $\Delta\theta o$ and the absolute value of the second movement amount component value $\Delta\theta c$. It is to be noted that the sign of the first operation amount component value $\Delta\lambda o$ and the sign of the first movement amount component value $\Delta\lambda c$ coincide with each other, and the sign of the second operation amount component value $\Delta\theta o$ and the sign of the second movement amount component value $\Delta\theta c$ coincide with each other. Further, the cursor coordinate values ($\lambda c$, $\theta c$) after movement of the cursor C in the frame are determined on the basis of the current position of the center G of gravity of the cursor C and the first movement amount component value $\Delta\lambda c$ and second movement amount component value $\Delta\theta c$. For example, it is assumed that the cursor coordinate values ($\lambda c$, $\theta c$) representative of the position of the center G of gravity of the cursor C in a certain frame are ($\lambda c1$, $\theta c1$). Further, it is assumed that the first movement amount component value $\Delta\lambda c$ and the second movement amount component value $\Delta\theta c$ are determined. In this case, if the cursor coordinate values ($\lambda c$, $\theta c$) representative of the position of the center G of gravity of the cursor C after the movement of the cursor C in the frame are ($\lambda c2$, $\theta c2$), then the value $\lambda c2$ becomes $\lambda c1+\Delta\lambda c$, and the value $\theta c2$ becomes $\theta c1+\Delta\theta c$.

In the following, the relationship depicted in FIG. 11 is described further. In the present embodiment, in a range which is represented as low speed range R1 in FIG. 11 and in which the absolute value of the operation amount component value is low, the relationship between the absolute value of the operation amount component value and the absolute value of the movement amount component value associated with the operation amount component is represented by an exponential function. Therefore, the ratio of the absolute value of a movement amount component value associated with the operation amount component to the absolute value of the operation amount component value is smaller than that in an alternative case in which the absolute value of the operation amount component value and the absolute value of the movement amount component value associated with the operation amount component increase in proportion to each other. That is, the sensitivity of the controller 14 is lower than that in the case in which the absolute value of the operation amount component value and the absolute value of the movement amount component value associated with the operation amount component increase in proportion to each other. Therefore, in the present embodiment, a movement of the cursor C not intended by the user, which occurs when the controller 14 actually sways although the user guesses that the controller 14 is stopped, can be suppressed. Further, in the present embodiment, since the sensitivity of the controller 14 is low in the low speed range R1, the user can carry out positioning of the cursor C with a high degree of accuracy. Therefore, in the present embodiment, positioning of the cursor C to a target position can be carried out readily. Also in the low speed range R1, if the absolute value of the operation amount component value is not 0, then the absolute value of the movement amount component value associated with the operation amount component is not 0. Therefore, when an operation for the controller 14 is being detected, the cursor C moves, and therefore, the user can recognize that an operation for the controller 14 is being carried out.

Further, in the present embodiment, in a range other than the low speed range R1, the absolute value of the operation amount component value and the absolute value of the movement amount component value associated with the operation amount component increase in proportion to each other. Further, in a region in which the absolute value of the operation amount component value is high, the ratio of the absolute value of the movement amount component value associated with the operation amount component to the absolute value of the operation amount component value is higher than that in another region in which the absolute value of the operation amount component value is medium. The range in which the absolute value of the operation amount component value is high is represented as high speed range R3 in FIG. 11, and the range in which the absolute value of the operation amount component value is medium is represented as medium speed range R2 in FIG. 11. By the configuration described above, in the high speed range R3, the ratio of the value representative of the amount of movement of the cursor C to the value representative of the operation amount is higher than that in the medium speed range R2, and therefore, the operation amount when the cursor C is moved fast decreases.

Further, in the present embodiment, the ratio of the absolute value of the second movement amount component value $\Delta\theta c$ to the absolute value of the second operation amount component value $\Delta\theta o$ is smaller than the ratio of the absolute value of the first movement amount component value $\Delta\lambda c$ to the absolute value of the first operation amount component value $\Delta\lambda o$. In particular, for example, where the absolute value of the second operation amount component value $\Delta\theta o$ is 1.5 times the absolute value of the first operation amount component value $\Delta\lambda o$, the absolute value of the first movement amount component value $\Delta\lambda c$ and the absolute value of the second movement amount component value $\Delta\theta c$ are equal to each other. FIG. 11 depicts that, where the absolute value of the first movement amount component value $\Delta\lambda c$ and the absolute value of the second movement amount component value $\Delta\theta c$ are equal to a, the absolute value of the first operation amount component value $\Delta\lambda o$ is b and the absolute value of the second operation amount component value $\Delta\theta o$ is 1.5 b. In other words, the sensitivity of the controller 14 is lower in the vertical direction than in the horizontal direction. In the present embodiment, since the disposition distance between the keys K along the vertical direction is shorter than the disposition distance between the keys K along the horizontal direction, a finer operation is required for the vertical direction than the horizontal direction. Further, since the number of the keys K disposed along the vertical direction is smaller than the number of the keys K disposed along the horizontal direction, the amount of movement of a cursor C when the key K is to be selected is liable to become greater in the horizontal direction. Meanwhile, in the vertical direction, the position of the cursor C is liable to be blurred by an operation of an operation member such as the direction keys DK1 to DK4 or the buttons B1 to B4. In the present embodiment, taking the foregoing circumferences into consideration, the sensitivity of the controller 14 in the vertical direction is set lower than the sensitivity of the controller 14 in the horizontal direction to improve the operability of an operation for moving the cursor C to a target position.

Further, in the present embodiment, within a predetermined period of time (for example, five frames, namely, approximately 80 milliseconds) after a determination operation is carried out, the movement of the cursor C is suppressed. Therefore, in the present embodiment, a movement of the cursor C not intended by the user, which arises from a determination operation, in the present embodiment, for example, depression of the button B1, is suppressed.

Further, in the present embodiment, if the position of the center G of gravity of the cursor C after movement is outside the range of the movable region MA, then the movable region MA moves along the direction of the movement of the cursor C thereby to maintain the state in which the cursor C is disposed in the movable region MA. As a result, the movable range of the cursor C is limited to the movable region MA in this manner. For example, it is assumed that the cursor coordinate values (λc, θc) representative of the position of the center G of gravity changes from (λc', θc') to (λc", θc') owing to the leftward movement of the position of the center G of gravity of the cursor C as depicted in FIG. 13. Further, it is assumed that the position of the center G of gravity of the cursor C after the movement exceeds the range of the movable region MA. In this case, the movable region MA moves in the leftward direction along the spherical plane in the cursor space 36 as depicted in FIG. 13 so that the position of the center G of gravity of the cursor C after the movement may be a position on the left side of the movable region MA. In other words, the movable region MA moves in the leftward direction along the spherical plane in the cursor space 36 so that the value λc" may be set as the coordinate value λ1 representative of the position of the left side of the movable region MA. Since, in the present embodiment, the posture of the controller 14 can be changed while the state in which the cursor C is disposed on an edge of the movable region MA is maintained in this manner, it is possible to adjust the controller 14 so that it has a posture in which it can be operated readily by the user. As a result, such a situation that the user must explicitly carry out a resetting operation decreases.

Further, in the present embodiment, the movable region MA is a rectangular region which occupies part of the on-screen keyboard as depicted in FIG. 10, and the keys K are disposed at positions of the left, lower and right sides of the movable region MA. Especially, the enter key EK is disposed at the right lower corner position of the movable region MA. In the present embodiment, since the keys K are disposed on the edges of the movable region MA, when the user tries to select a key K disposed on an edge of the movable region MA, the user can carry out an operation for moving the cursor C without taking care of the amount of movement. In this manner, with the present embodiment, the operability in selection of a key K by the cursor C is improved. Further, as can be recognized from the foregoing description, it is desirable to dispose a key K which is used in a high frequency such as, for example, the enter key EK on an outer periphery of the on-screen keyboard, namely, on an edge of the movable region MA.

Further, in the present embodiment, in an initial state or when a resetting operation is performed, the Y1 direction of the controller 14 is set so as to coincide with the reference direction in the detection result space 34 depicted in FIG. 7 as described hereinabove. Further, in the present embodiment, in an initial state or when a resetting operation is performed, the Y1 direction of the controller 14 is set also so as to coincide with the reference direction in the cursor space 36 depicted in FIG. 9. Further, in the present embodiment, in an initial state or when a resetting operation is performed, the operation coordinate values (λo, θo) and the cursor coordinate values (λc, θc) are set to (0, 0). Further, in the present embodiment, in an initial state or when a rest operation is performed, the position of the movable region MA in the cursor space 36 is set so that the position of the center of gravity of the movable region MA depicted in FIG. 9 coincides with the position of the center G of gravity of the cursor C.

Figure 8:
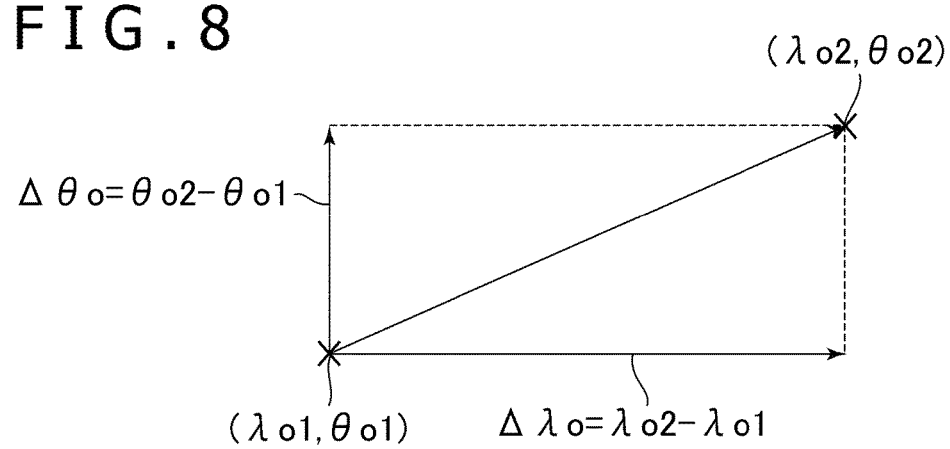
FIG. 8 is a view depicting an example of a relationship between an operation coordinate value and an operation amount component value.

Further, in the present embodiment, if the angle defined by a direction corresponding to the posture of the controller 14 and the reference direction in a state in which the center G of gravity of the cursor C is disposed on an edge of the movable region MA exceeds 45 degrees, then a compulsory resetting process is executed. Also when a state in which the center of gravity of the cursor C is disposed on an edge of the movable region MA continues for a predetermined period of time, for example, for 8 seconds, the compulsory resetting process is executed. If the compulsory resetting process is executed, then the Y1 direction of the controller 14 is set so as to coincide with the reference direction in the detection result space 34 and the Y1 direction of the controller 14 is set so as to coincide with the reference direction in the cursor space 36. Further, the position of the movable region MA in the cursor space 36 is set so that the position of the cursor C in the movable region MA depicted in FIG. 8 before execution of the compulsory resetting process is maintained. Further, in the present embodiment, a movement of the cursor C is suppressed within a predetermined period of time (for example, two frames, namely, approximately 32 milliseconds) after the compulsory resetting process is executed. In the gyro sensor, displacement of the posture from the reference is accumulated as time passes after detection of the posture is started. As a result, the position of the cursor C is sometimes blurred or a drift that the cursor C moves also in a stationary state sometimes occurs. Therefore, it is necessary to carry out a process when the resetting operation described is carried out or the compulsory resetting process described above at any timing. In the present embodiment, even if the compulsory resetting process is executed, the position of the cursor C in the movable region MA depicted in FIG. 8 is maintained, and therefore, the compulsory resetting process can be executed without being noticed by the user.

Figure 14:
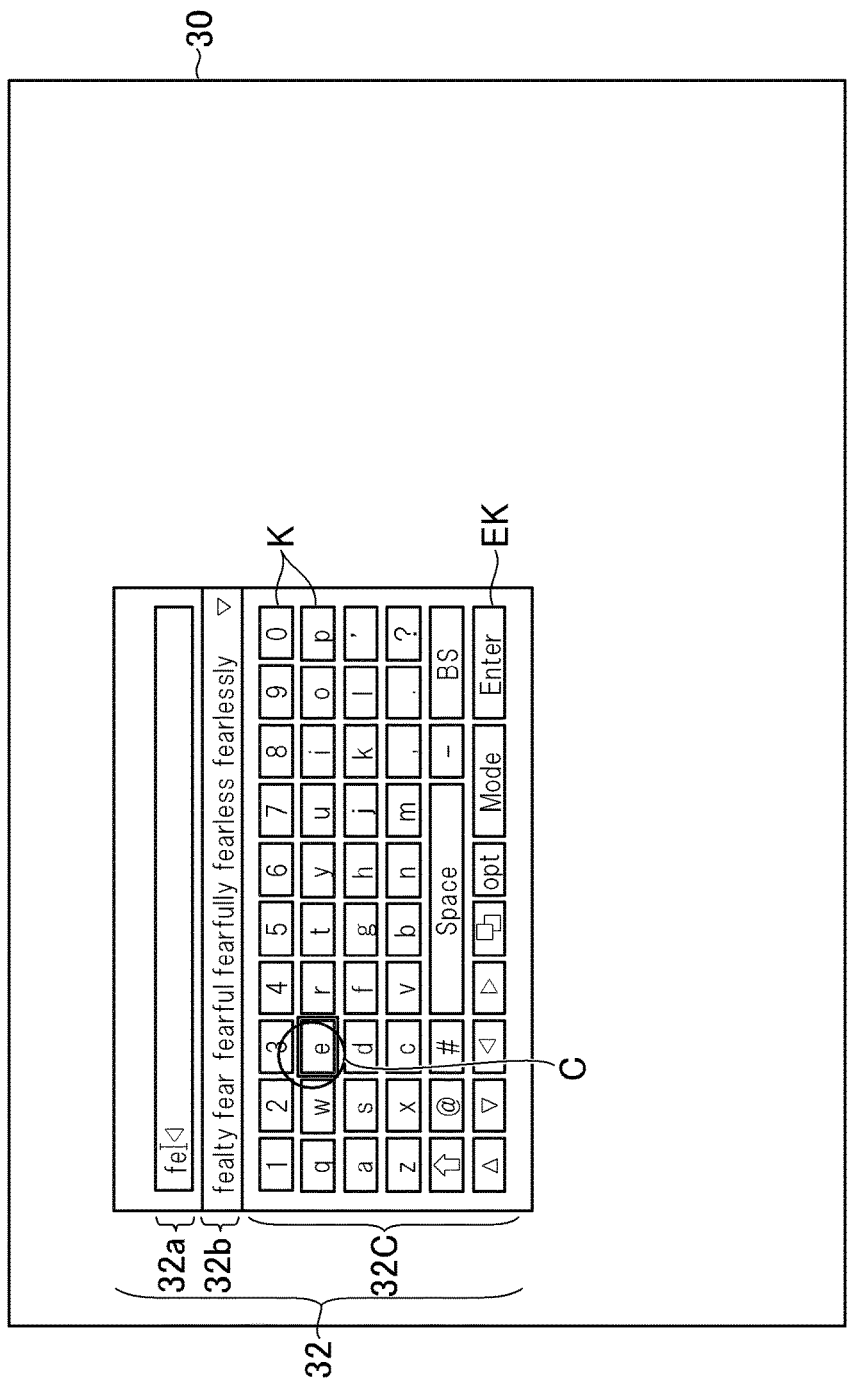
FIG. 14 is a view depicting a further example of an entire image.

Further, in the present embodiment, the user can change the position of the on-screen keyboard region 32 in the entire image 30. In the present embodiment, if the user carries out an operation for depressing a direction key DK or an operation for tilting an analog controller AC, then the on-screen keyboard region 32 is moved in a direction associated with the depressed direction key DK or in the tilted direction of the analog controller AC. FIG. 14 depicts the entire image 30 when the on-screen keyboard region 32 is moved leftwardly upwardly from a state in which the entire image 30 depicted in FIG. 5 is displayed. In the present embodiment, even if the on-screen keyboard region 32 moves, if the posture of the controller 14 does not change, then the position of the cursor C in the movable region MA does not change.

As described above, the information processing apparatus 12 according to the present embodiment takes charge as a cursor position controlling apparatus for controlling the position of the cursor C. In the following, further description is given principally of a moving process of the cursor C.

Figure 15:
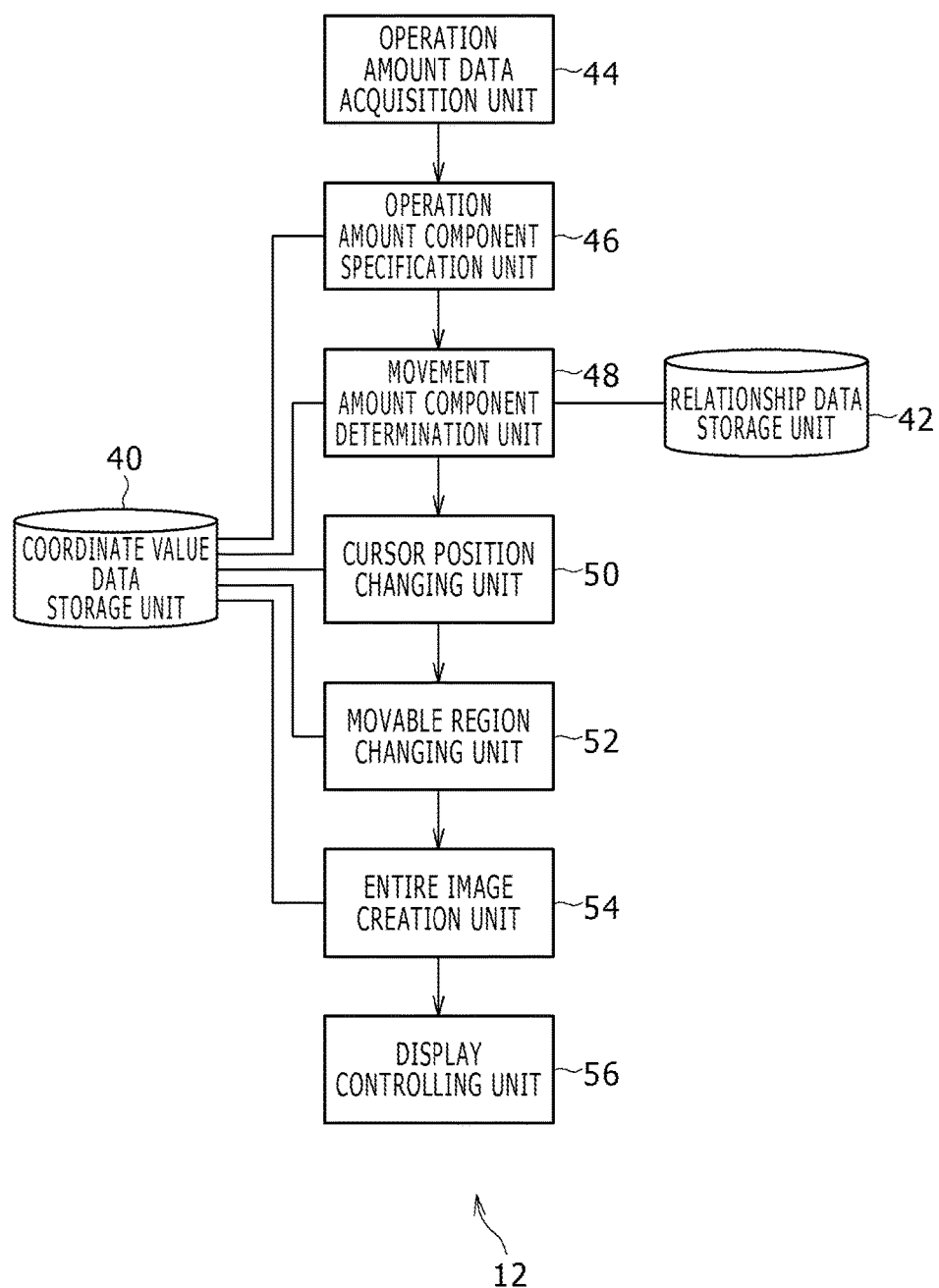
FIG. 15 is a functional block diagram depicting an example of functions incorporated in the information processing apparatus according to the embodiment of the present invention.

FIG. 15 is a functional block diagram depicting an example of functions incorporated in the information processing apparatus 12 according to the present embodiment. It is to be noted that the information processing apparatus 12 according to the present embodiment need not incorporate all of the functions depicted in FIG. 15 and may incorporate a function or functions other than the functions depicted in FIG. 15.

The information processing apparatus 12 according to the present embodiment includes, as depicted in FIG. 15, for example, a coordinate data storage unit 40, a relationship data storage unit 42, an operation amount data acquisition unit 44, an operation amount component specification unit 46, a movement amount component determination unit 48, a cursor position changing unit 50, a movable region changing unit 52, an entire image creation unit 54 and a display controlling unit 56. The coordinate data storage unit 40 and the relationship data storage unit 42 are incorporated principally as the storage unit 22. The operation amount data acquisition unit 44 is incorporated principally as the communication unit 24. The other functions are incorporated principally as the control unit 20.

The functions described above are incorporated by the control unit 20 executing a program installed in the information processing apparatus 12 which is a computer, the program including instructions corresponding to the functions described above. This program is supplied to the information processing apparatus 12 through, for example, a computer-readable information storage medium such as an optical disk, a magnetic disk, a magnetic tape, a magneto-optical disk or a flash memory or through a computer network such as the Internet.

The coordinate data storage unit 40 stores, in the present embodiment, operation coordinate value data indicative of operation coordinate values ($\lambda o$, $\theta o$) and cursor coordinate value data indicative of cursor coordinate values ($\lambda c$, $\theta c$). Further, the coordinate data storage unit 40 stores movable region coordinate value data indicative of coordinate values (($\lambda 1$, $\theta 1$), ($\lambda 1$, $\theta 2$), ($\lambda 2$, $\theta 1$) and ($\lambda 2$, $\theta 2$) of the positions of the four corners of the movable region MA.

The relationship data storage unit 42 stores, in the present embodiment, first relationship data indicative of a relationship between the first operation amount component value $\Delta\lambda o$ and the first movement amount component value $\Delta\lambda c$ and second relationship data indicative of a relationship between the second operation amount component value $\Delta\theta o$ and the second movement amount component value $\Delta\theta c$. The first relationship data and the second relationship data are incorporated, for example, as a table which associates operation amount component values and movement amount component values associated with the operation amount component. It is to be noted that the first relationship data and the second relationship data may be incorporated as data indicative of a mathematical formula such as a function for determining, on the basis of an operation amount component value, a moving amount component value associated with the operation amount component.

The operation amount data acquisition unit 44 acquires operation amount data transmitted thereto from the controller 14 and associated with an operation amount vector which represents a direction and a magnitude of the operation. The operation amount data acquisition unit 44 acquires, in the present embodiment, rotation information of the quaternion format, for example, detected by the gyro sensor as operation amount data associated with the rotation amount vector. It is to be noted that the operation amount data acquisition unit 44 may acquire operation amount data associated with a detection result of a sensor other than the rotation information detected by the gyro sensor. Particularly, the operation amount data acquisition unit 44 may acquire operation amount data associated with an operation amount vector representative of a direction and a magnitude of a tilting movement when the analog controller AC is tilted.

The operation amount component specification unit 46 specifies the magnitude of the first operation amount component which is a component of the operation amount vector in a first operation direction and the magnitude of the second operation amount component which is a component of the operation amount vector in a second direction different from the first operation direction. The operation amount component specification unit 46 specifies, in the present embodiment, the first operation amount component value $\Delta\lambda o$ and the second operation amount component value $\Delta\theta o$, for example, on the basis of the operation coordinate value data stored in the coordinate data storage unit 40 and the operation amount data acquired by the operation amount data acquisition unit 44. Then, the operation amount component specification unit 46 updates the operation coordinate values ($\lambda o$, $\theta o$) indicated by the operation coordinate value data stored in the coordinate data storage unit 40 to the operation coordinate values ($\lambda o$, $\theta o$) specified on the basis of the operation amount data.

In the present embodiment, the first operation direction corresponds to the direction of rotation around the Z1-Z2 direction of the controller 14, and the second operation direction corresponds to the direction of rotation around the X1-X2 direction of the controller 14. It is to be noted that the first operation direction or the second direction operation is not limited to the operation directions described above. For example, the direction of rotation of the controller 14 around the Y1-Y2 direction may correspond to the first operation direction or the second direction operation.

The movement amount component determination unit 48 determines, on the basis of the magnitude of the first operation amount component, the magnitude of the first moving amount component which is a component in the first disposition direction of the moving amount vector representative of the amount of movement of the cursor C. Further, the movement amount component determination unit 48 determines, on the basis of the magnitude of the second operation amount component, the magnitude of the second moving amount component which is a component in the second disposition direction of the moving amount vector.

Here, the first disposition direction or the second disposition direction represents a disposition direction of the choices. Further, the disposition distance between choices along the second disposition direction is shorter than the disposition distance between the choices along the first disposition direction. It is to be noted that the number of choices disposed along the second disposition direction may be smaller than the number of choices disposed along the first disposition direction. In the present embodiment, the disposition distance between the keys K along the vertical direction is shorter than the disposition distance between the keys K along the horizontal direction as described hereinabove. Further, the number of keys K disposed along the vertical direction is smaller than the number of keys K disposed along the horizontal direction. Therefore, in the present embodiment, the first disposition direction corresponds to the horizontal direction and the second disposition direction corresponds to the vertical direction. It is to be noted that the first disposition direction or the second disposition direction need not be the horizontal direction or the vertical direction.

Further, in the present embodiment, the ratio of the magnitude of the first moving amount component to the magnitude of the first operation amount component is smaller than the ratio of the magnitude of the second moving amount component to the magnitude of the second operation amount component.

In the present embodiment, the movement amount component determination unit 48 determines the first movement amount component value Δλc particularly on the basis of, for example, the first relationship data and the first operation amount component value Δλo. Further, the movement amount component determination unit 48 determines the second movement amount component value Δθc particularly on the basis of, for example, the second relationship data and the second operation amount component value Δθo.

The cursor position changing unit 50 changes the position of the cursor C from the current position of the cursor C to a position spaced, in the first disposition direction, by the magnitude of the first moving amount component, and in the second disposition direction, by the magnitude of the second moving amount component. The cursor position changing unit 50 acquires, in the present embodiment, the cursor coordinate values (λc, θc) indicated by the cursor coordinate value data, for example, stored in the coordinate data storage unit 40. Then, the cursor position changing unit 50 specifies coordinate values (λc, θc) indicative of the position of the cursor C after the movement on the basis of the cursor coordinate values (λc, θc) and the first movement amount component value Δλc and second movement amount component value Δθc. Then, the cursor position changing unit 50 updates the cursor coordinate values (λc, θc) indicated by the cursor coordinate value data in the data stored in the coordinate data storage unit 40 to the specified cursor coordinate values (λc, θc).

The movable region changing unit 52 moves the movable region MA in such a manner as described above if the position of the center G of gravity of the cursor C after the movement is outside the movable region MA. More particularly, for example, if the cursor coordinate values (λc, θc) after the movement are outside the region surrounded by the four coordinate value pairs indicated by the movable region coordinate value data, then the movable region changing unit 52 updates the for coordinate value pairs indicated by the movable region coordinate value data in such a manner as described above.

The entire image creation unit 54 creates an entire image 30 on the basis of the cursor coordinate value data and the movable region coordinate value data stored in the coordinate data storage unit 40.

The display controlling unit 56 outputs the entire image 30 created by the entire image creation unit 54 to the display unit 16.

Figure 16:
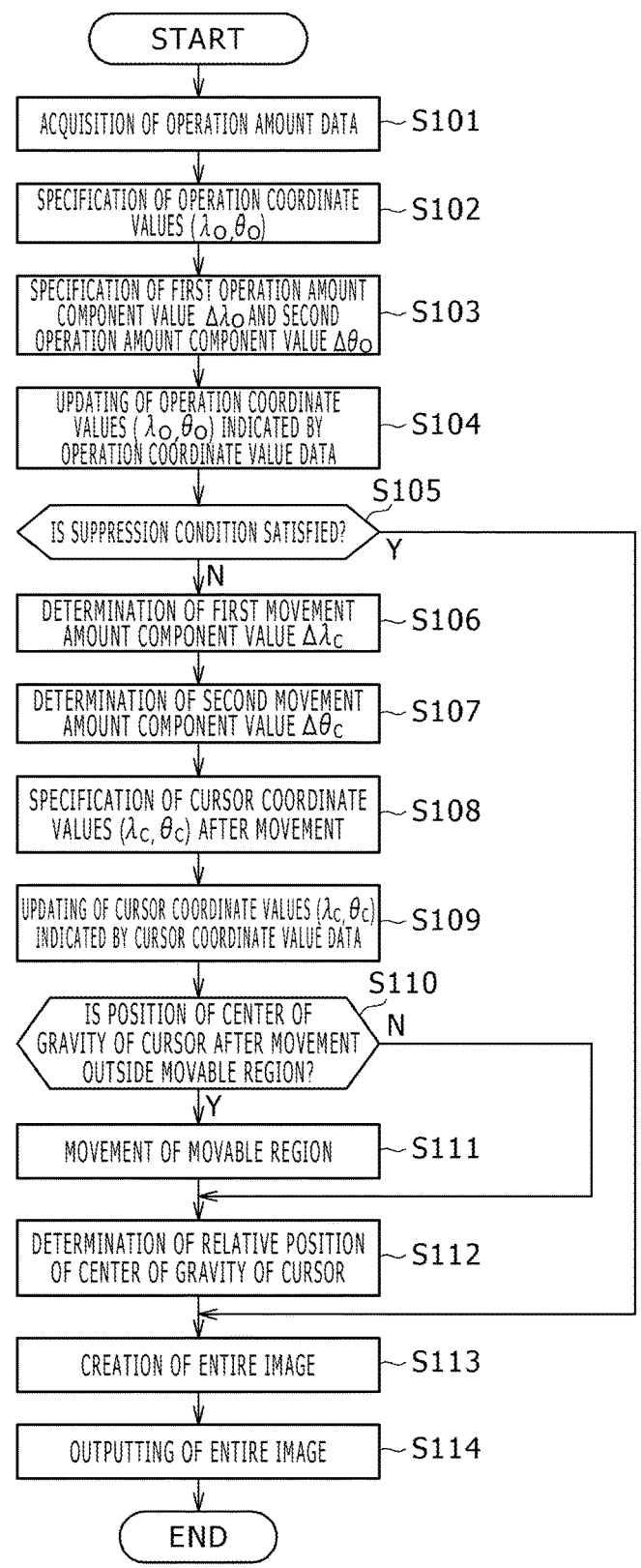
FIG. 16 is a flow chart depicting an example of a flow of processing executed by the information processing apparatus according to the embodiment of the present invention.

Here, an example of a flow of processing carried out for each frame by the information processing apparatus 12 according to the present embodiment is described with reference to a flow chart depicted in FIG. 16.

First, the operation amount data acquisition unit 44 acquires operation amount data associated with a detection result by the gyro sensor (S101). Then, the operation amount data acquisition unit 44 specifies operation coordinate values (λo, θo) in the pertaining frame on the basis of the operation amount data acquired by the process indicated at S101 (S102). Then, the operation amount data acquisition unit 44 specifies a first operation amount component value Δθo and a second operation amount component value Δθo on the basis of a difference between the operation coordinate values (λo, θo) specified by the process indicated at S102 and operation coordinate values (λo, θo) stored in the coordinate data storage unit 40 (S103). Then, the operation amount component specification unit 46 updates the operation coordinate values (λo, θo) indicated by the operation coordinate value data stored in the coordinate data storage unit 40 to the operation coordinate values (λo, θo) specified by the process indicated at S102 (S104).

Then, the movement amount component determination unit 48 decides whether or not a predetermined suppression condition is satisfied (S105). Here, if a condition that, for example, the time at present is within a predetermined time period (for example, five frames) after the determination operation is performed or the time at present is within a predetermined period of time (for example, two frames) after a compulsory resetting process is executed is satisfied, then it is decided that the predetermined suppression condition is satisfied.

If it is decided that the predetermined suppression condition is not satisfied (S105: N), then the movement amount component determination unit 48 determines a first movement amount component value Δλc on the basis of the first relationship data and the first operation amount component value Δλo specified by the process indicated at S103 (S106). Then, the movement amount component determination unit 48 determines a second movement amount component value Δθc on the basis of the second relationship data and the second operation amount component value Δθo specified by the process indicated at S103 (S107).

Then, the cursor position changing unit 50 specifies the cursor coordinate value (λc, θc) after the movement of the cursor C (S108). At this time, in the present processing example, the value of the θc component of the cursor coordinate values (λc, θc) of the cursor C after the movement is specified on the basis of the value of the θc component of the cursor coordinate values (λc, θc) indicated by the cursor coordinate value data and the first movement amount component value Δλc determined by the process indicated at S106. Further, the value of the λc component of the cursor coordinate values (λc, θc) indicative of the position of the cursor C after the movement is specified on the basis of the value of the λc component of the cursor coordinate values (λc, θc) indicated by the cursor coordinate value data and the second movement amount component value Δθc determined by the process indicated at S107.

Then, the cursor position changing unit 50 updates the cursor coordinate values (λc, θc) indicated by the cursor coordinate value data stored in the coordinate data storage unit 40 to the cursor coordinate values (λc, θc) specified by the process indicated at S108 (S109).

Then, the movable region changing unit 52 decides whether or not the position of the center G of gravity of the cursor C is outside the movable region MA (S110). By the process indicated at S110, particularly it is decided that, for example, the position represented by the cursor coordinate values (λc, θc) after the updating is outside the region surrounded by the four coordinate value pairs indicated by the movable region coordinate value data. If the position is outside the movable region MA (S110: Y), then the movable range changing unit 52 moves the movable region MA as described hereinabove (S111). Particularly by the process indicated at S111, for example, the four coordinate value pairs indicated by the movable region coordinate value data stored in the coordinate data storage unit 40 are updated.

If the position is within the movable region MA (S110: N) or if the process indicated at S111 is ended, then the entire image creation unit 54 determines a relative position of the center G of gravity of the cursor C in the movable region MA depicted in FIG. 10 (S112). By the process indicated at S112, the relative position is determined on the basis of, for example, the cursor coordinate value data and the movable region coordinate value data.

Then, if it is decided by the process indicated at S105 that the predetermined suppression condition is satisfied (S105: Y) or if the process indicated at S112 is ended, then the entire image creation unit 54 creates an entire image 30 including the movable region MA in which the center G of gravity of the cursor C is disposed at the position determined by the process indicated at S112 (S113).

Then, the display controlling unit 56 outputs the entire image 30 created by the process indicated at S113 to the display unit 16 (S114) and then ends the processing indicated in the present processing example. When the display unit 16 accepts the entire image 30 outputted by the process indicated at S115, it displays the entire image 30 on the screen thereof.

It is to be noted that the present invention is not limited to the embodiment described above.

For example, the on-screen keyboard may have a variable size. Then, for example, on the basis of the size of the on-screen keyboard, a magnitude of a movement amount component associated with an operation amount component with respect to the magnitude of the operation amount component may be determined. More particularly, for example, as the size of the on-screen keyboard decreases, the magnitude of a movement amount component associated with an operation amount component with respect to the magnitude of the operation amount component may decrease.

Alternatively, the user may change the magnitude of a movement amount component associated with an operation amount component with respect to the magnitude of the operation amount component.

Alternatively, the information processing apparatus 12 may have the display unit 16 built therein. Alternatively, the information processing apparatus 12 may be configured from a plurality of housings. Further, the particular character strings indicated hereinabove or the particular character strings in the drawings are exemplary, and there is no restriction to such character strings.

The invention claimed is:

1. A cursor position controlling apparatus for controlling a position at which a cursor, for selecting, from within a screen image in which a plurality of choices are disposed in a matrix, one of the plurality of choices, is to be displayed, comprising:
   a cursor position changing unit configured to change a position at which the cursor is to be displayed in response to a linear direction and a magnitude of an operation;
   the plurality of choices being disposed in a juxtaposed relationship in a first linear disposition direction associated with a first linear operation direction of the operation and a second disposition linear direction associated with a second linear operation direction of the operation;
   a linear disposition distance between the choices along the second linear disposition direction being shorter than a linear disposition distance between the choices along the first linear disposition direction;
   an amount of movement, of the position at which the cursor is to be displayed and which moves in the second linear disposition direction when a cursor control operation of an operation inputting apparatus is carried out, by a second angular rotation of the operation inputting apparatus at a second angular rotation magnitude, to transmit from a cursor controller a movement magnitude in a second linear direction corresponding to the second linear operation direction is smaller than an amount of movement, of the position at which the cursor is to be displayed and which moves in the first linear disposition direction when a cursor control operation of the operation inputting apparatus is carried out, by a first angular rotation of the operation inputting apparatus at a first angular rotation magnitude, to transmit from the cursor controller a movement magnitude in a first linear direction corresponding to the first linear operation direction, the movement magnitudes being similar; wherein
   the ratio of the second angular rotation magnitude to the corresponding second linear direction movement magnitude varies along the second linear disposition direction; and wherein
   the ratio of the first angular rotation magnitude to the corresponding first linear direction movement magnitude varies along the first linear disposition direction.

2. The cursor position controlling apparatus according to claim 1, wherein
   the first linear disposition direction is a horizontal direction on a display unit on which the image is displayed; and
   the second linear disposition direction is a vertical direction on the display unit.

3. The cursor position controlling apparatus according to claim 1, wherein the position to which the cursor is permitted to move is limited to a region which occupies part of the screen image.

4. The cursor position controlling apparatus according to claim 3, wherein the choices are disposed at ends of the region.

5. The cursor position controlling apparatus according to claim 1, wherein
   the operation inputting apparatus includes a gyro sensor;
   the first linear disposition direction is associated with a first angular rotation direction and the second linear disposition direction is associated with a second angular rotation direction; and
   an amount of movement, of the position at which the cursor is to be displayed and which moves in the second linear disposition direction when an operation of a given angular rotation amount is carried out in the second angular rotation direction is smaller than an amount of movement of the position at which the cursor is to be displayed and which moves in the first linear disposition direction when an operation of the given angular rotation amount is carried out in the first angular rotation direction.

6. The cursor position controlling apparatus according to claim 1, wherein the number of choices disposed along the second linear disposition direction is smaller than the number of choices disposed along the first linear disposition direction.

7. A cursor position controlling method for a cursor position controlling apparatus for controlling a position at which a cursor, for selecting, from within a screen image in which a plurality of choices are disposed in a matrix, one of the plurality of choices, is to be displayed, the method comprising:
   a step of changing a position at which the cursor is to be displayed in response to a linear direction and a magnitude of an operation;
   the plurality of choices being disposed in a juxtaposed relationship in a first linear disposition direction associated with a first linear operation direction of the operation and a second disposition linear direction associated with a second linear operation direction of the operation;
   a linear disposition distance between the choices along the second linear disposition direction being shorter than a linear disposition distance between the choices along the first linear disposition direction;

an amount of movement, of the position at which the cursor is to be displayed and which moves in the second linear disposition direction when a cursor control operation of an operation inputting apparatus is carried out, by a second angular rotation of the operation inputting apparatus at a second angular rotation magnitude, to transmit from a cursor controller a movement magnitude in a second linear direction corresponding to the second linear operation direction is smaller than an amount of movement, of the position at which the cursor is to be displayed and which moves in the first linear disposition direction when a cursor control operation of the operation inputting apparatus is carried out, by a first angular rotation of the operation inputting apparatus at a first angular rotation magnitude, to transmit from the cursor controller a movement magnitude in a first linear direction corresponding to the first linear operation direction, the movement magnitudes being similar; wherein the ratio of the second angular rotation magnitude to the corresponding second linear direction movement magnitude varies along the second linear disposition direction; and wherein the ratio of the first angular rotation magnitude to the corresponding first linear direction movement magnitude varies along the first linear disposition direction.

8. A computer and a non-transitory, computer readable storage medium containing a program, which when executed by the computer, controls a position at which a cursor, for selecting, from within a screen image in which a plurality of choices are disposed in a matrix, one of the plurality of choices, is to be displayed, the program further causing the computer to carry out actions, comprising:

by a changing unit, changing a position at which the cursor is to be displayed in response to a linear direction and a magnitude of an operation;

the plurality of choices being disposed in a juxtaposed relationship in a first linear disposition direction associated with a first linear operation direction of the operation and a second linear disposition direction associated with a second linear operation direction of the operation;

a linear disposition distance between the choices along the second linear disposition direction being shorter than a linear disposition distance between the choices along the first linear disposition direction;

an amount of movement, of the position at which the cursor is to be displayed and which moves in the second linear disposition direction when a cursor control operation of an operation inputting apparatus is carried out, by a second angular rotation of the operation inputting apparatus at a second angular rotation magnitude, to transmit from a cursor controller a movement magnitude in a second linear direction corresponding to the second linear operation direction is smaller than an amount of movement, of the position at which the cursor is to be displayed and which moves in the first linear disposition direction when a cursor control operation of the operation inputting apparatus is carried out, by a first angular rotation of the operation inputting apparatus at a first angular rotation magnitude, to transmit from the cursor controller a movement magnitude in a first linear direction corresponding to the first linear operation direction, the movement magnitudes being similar; wherein the ratio of the second angular rotation magnitude to the corresponding second linear direction movement magnitude varies along the second linear disposition direction; and wherein the ratio of the first angular rotation magnitude to the corresponding first linear direction movement magnitude varies along the first linear disposition direction.

9. A non-transitory, computer-readable information storage medium storing a program, which when executed by a computer, causes the computer to control a position at which a cursor, for selecting, from within a screen image in which a plurality of choices are disposed in a matrix, one of the plurality of choices, is to be displayed, the program further causing the computer to carry out actions, comprising:

by a changing unit, changing a position at which the cursor is to be displayed in response to a linear direction and a magnitude of an operation;

the plurality of choices being disposed in a juxtaposed relationship in a first linear disposition direction associated with a first linear operation direction of the operation and a second linear disposition direction associated with a second linear operation direction of the operation;

a linear disposition distance between the choices along the second linear disposition direction being shorter than a linear disposition distance between the choices along the first linear disposition direction;

an amount of movement, of the position at which the cursor is to be displayed and which moves in the second linear disposition direction when a cursor control operation of an operation inputting apparatus is carried out, by a second angular rotation of the operation inputting apparatus at a second angular rotation magnitude, to transmit from a cursor controller a movement magnitude in a second linear direction corresponding to the second linear operation direction is smaller than an amount of movement, of the position at which the cursor is to be displayed and which moves in the first linear disposition direction when a cursor control operation of the operation inputting apparatus is carried out, by a first angular rotation of the operation inputting apparatus at a first angular rotation magnitude, to transmit from the cursor controller a movement magnitude in a first linear direction corresponding to the first linear operation direction, the movement magnitudes being similar; wherein the ratio of the second angular rotation magnitude to the corresponding second linear direction movement magnitude varies along the second linear disposition direction; and wherein the ratio of the first angular rotation magnitude to the corresponding first linear direction movement magnitude varies along the first linear disposition direction.

\* \* \* \* \*